(12) United States Patent
Gorce

(10) Patent No.: US 10,421,536 B2
(45) Date of Patent: Sep. 24, 2019

(54) METHOD OF CONTROLLING AN ELECTRICAL TAXIING SYSTEM

(71) Applicant: SAFRAN LANDING SYSTEMS, Vélizy-Villacoublay (FR)

(72) Inventor: Clément Gorce, Vélizy-Villacoublay (FR)

(73) Assignee: SAFRAN LANDING SYSTEMS, Vélizy-Villacoublay (FR)

( * ) Notice: Subject to any disclaimer, the term of this patent is extended or adjusted under 35 U.S.C. 154(b) by 16 days.

(21) Appl. No.: 15/811,354

(22) Filed: Nov. 13, 2017

(65) Prior Publication Data
US 2018/0134377 A1 May 17, 2018

(30) Foreign Application Priority Data

Nov. 14, 2016 (FR) ...................................... 16 60977

(51) Int. Cl.
| | |
|---|---|
| B64C 25/40 | (2006.01) |
| G08G 5/06 | (2006.01) |
| B64C 25/34 | (2006.01) |
| B64C 25/50 | (2006.01) |
| G05D 1/00 | (2006.01) |
| G05D 1/02 | (2006.01) |

(52) U.S. Cl.
CPC ............ *B64C 25/405* (2013.01); *B64C 25/34* (2013.01); *B64C 25/50* (2013.01); *G05D 1/0083* (2013.01); *G05D 1/0223* (2013.01)

(58) Field of Classification Search
CPC .................................. B64C 25/40; G08G 5/06
See application file for complete search history.

(56) References Cited

U.S. PATENT DOCUMENTS

| | | | |
|---|---|---|---|
| 4,939,651 A | 7/1990 | Onishi | |
| 9,533,756 B2* | 1/2017 | Cox ...................... | B64C 25/405 |
| 2006/0235610 A1 | 10/2006 | Ariyur et al. | |
| 2015/0175257 A1* | 6/2015 | Gorce ................... | B64C 25/405 |
| | | | 701/3 |
| 2015/0375855 A1* | 12/2015 | Jaber ........................ | H02P 3/22 |
| | | | 318/400.26 |
| 2016/0082947 A1 | 3/2016 | Naumann et al. | |
| 2016/0358484 A1* | 12/2016 | Vana ...................... | B64D 47/06 |

OTHER PUBLICATIONS

Rapport de Recherche Préliminaire / Opinion Écrite sur la Brevetabilité de l'Invention, mailed Jul. 5, 2017, issued in corresponding French Application No. 1660977, filed Nov. 14, 2016, 7 pages.

* cited by examiner

Primary Examiner — Yuri Kan
(74) Attorney, Agent, or Firm — Christensen O'Connor Johnson Kindness PLLC

(57) ABSTRACT

A control method for controlling an electrical taxiing system adapted to moving an aircraft while it is taxiing, the method comprising the steps of: generating a ground speed setpoint for the aircraft; transforming the ground speed setpoint into an optimized speed setpoint presenting a curve as a function of time that has a predefined function comprising a plurality of linear portions, each having a slope that is a function of the ground speed setpoint; implementing a regulator loop having the optimized speed setpoint as its setpoint; and generating a command for the electrical taxiing system from an output of the regulator loop.

14 Claims, 3 Drawing Sheets

METHOD OF CONTROLLING AN ELECTRICAL TAXIING SYSTEM

TECHNICAL FIELD

Embodiments of the present disclosure relate to the field of aircraft taxiing.

BACKGROUND

A taxiing system installed on an aircraft makes it possible during stages when the aircraft is taxiing to move in a manner that is autonomous, i.e. avoiding making use of the main engines of the aircraft.

In an electrical taxiing system, wheels carried by one or more undercarriages are driven in rotation during stages of taxiing by actuators that include electric motors.

During stages of aircraft taxiing while using such a taxiing system, the aircraft is thus driven by the undercarriages that have wheels driven in rotation by the taxiing system.

It is important to control accurately the speed of such a taxiing system, in particular while maneuvering the aircraft (forwards or backwards) with an aircraft ground speed that is small.

Typically, for an aircraft ground speed of 2 knots (kt), the required accuracy is 10%, i.e. 0.2 kt, or about 10 centimeters per second (cm/s). Such accuracy is relatively complex to obtain, particularly since measurements of ground speed are subject to various sources of inaccuracy: inaccuracy of the sensor(s); data resolution; transmission delays; etc. The accuracy must also be robust in the face of large variations in the forces to which the taxiing system is subjected, given that the weight of the aircraft can vary over a range of one to two, and given that the effects of any slopes of the tracks on which the aircraft is taxiing are considerable.

SUMMARY

Embodiments of the present disclosure propose to improve the accuracy with which an electrical taxiing system of an aircraft is controlled at low speed.

In order to achieve this object, there is provided a control method for controlling an electrical taxiing system adapted to moving an aircraft while it is taxiing. The method comprises the steps of:

generating a ground speed setpoint for the aircraft;

transforming the ground speed setpoint into an optimized speed setpoint presenting a curve as a function of time that has a predefined function comprising a plurality of linear portions, each having a slope that is a function of the ground speed setpoint;

implementing a regulator loop having the optimized speed setpoint as its setpoint; and generating a command for the electrical taxiing system from an output of the regulator loop.

By transforming the ground speed setpoint into an optimized speed setpoint presenting a curve as a function of time that has a predefined profile, the predetermined profile is imposed as input to the regulation loop, thereby avoiding any instability in the regulation loop. With embodiments of the present disclosure, there is no need to calculate acceleration, where such calculation is a major source of inaccuracy.

DESCRIPTION OF THE DRAWINGS

The foregoing aspects and many of the attendant advantages of the claimed subject matter will become more readily appreciated as the same become better understood by reference to the following detailed description, when taken in conjunction with the accompanying drawings, wherein:

DETAILED DESCRIPTION

The detailed description set forth below in connection with the appended drawing, where like numerals reference like elements, is intended as a description of various embodiments of the disclosed subject matter and is not intended to represent the only embodiments. Each embodiment described in this disclosure is provided merely as an example or illustration and should not be construed as preferred or advantageous over other embodiments. The illustrative examples provided herein are not intended to be exhaustive or to limit the claimed subject matter to the precise forms disclosed. Similarly, any steps described herein may be interchangeable with other steps, or combinations of steps, in order to achieve the same or substantially similar result.

Embodiments of the present disclosure for controlling an electrical taxiing system are implemented in this example on an aircraft. The aircraft has main landing gear and auxiliary landing gear situated at the front of the aircraft. The main landing gear comprises undercarriages each having a rod slidably mounted in a strut of the landing gear and carrying two wheels. The electrical taxiing system acts on the wheels of the main landing gear to move the aircraft in an autonomous manner while taxiing the aircraft. The auxiliary landing gear has a steerable portion that can take up a steering angle, which is controlled in order to steer the aircraft while it is taxiing.

In this example, the electrical taxiing system has an actuator with an electric motor, an electrical power module (commonly referred to as a power computer, controller, electronics, etc.) and an electrical control module (commonly referred to as a control computer, controller, electronics, etc.). The electrical power module and the electrical control module may naturally be integrated within a single electrical unit.

Figure 1:
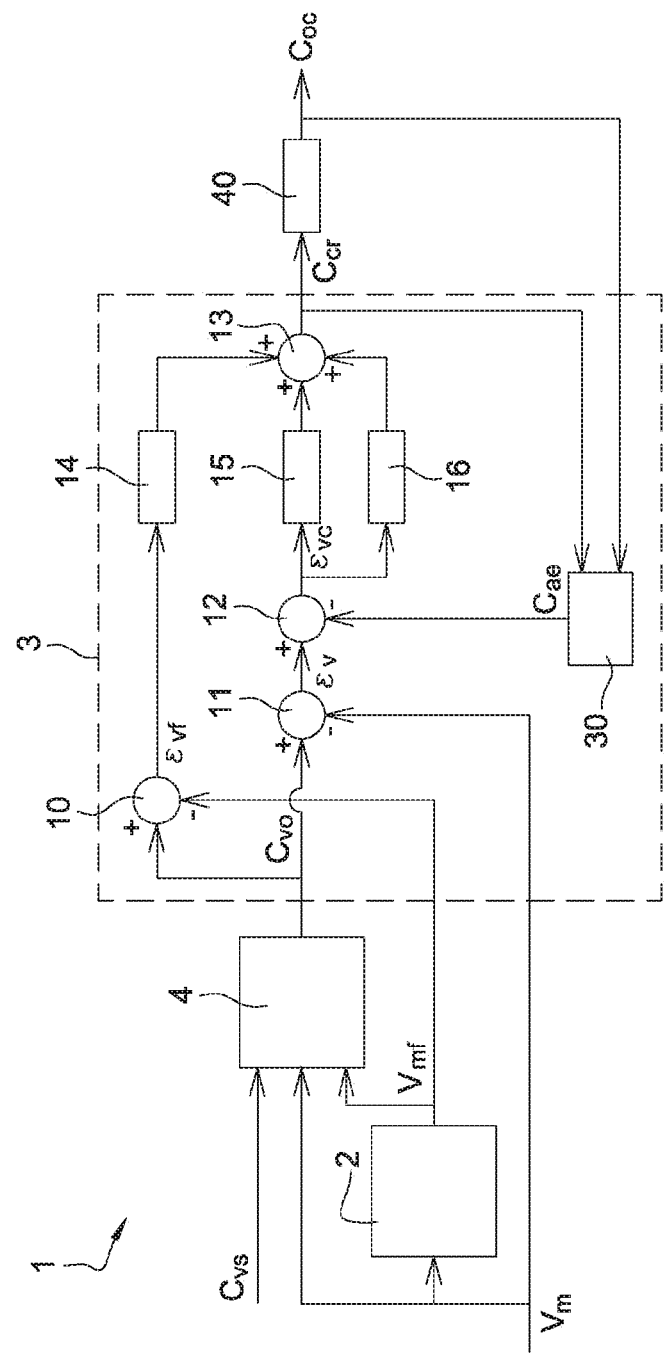
FIG. 1 shows a processing system implemented in a method in accordance with an embodiment of the present disclosure for controlling an electrical taxiing system.
Figure 2:
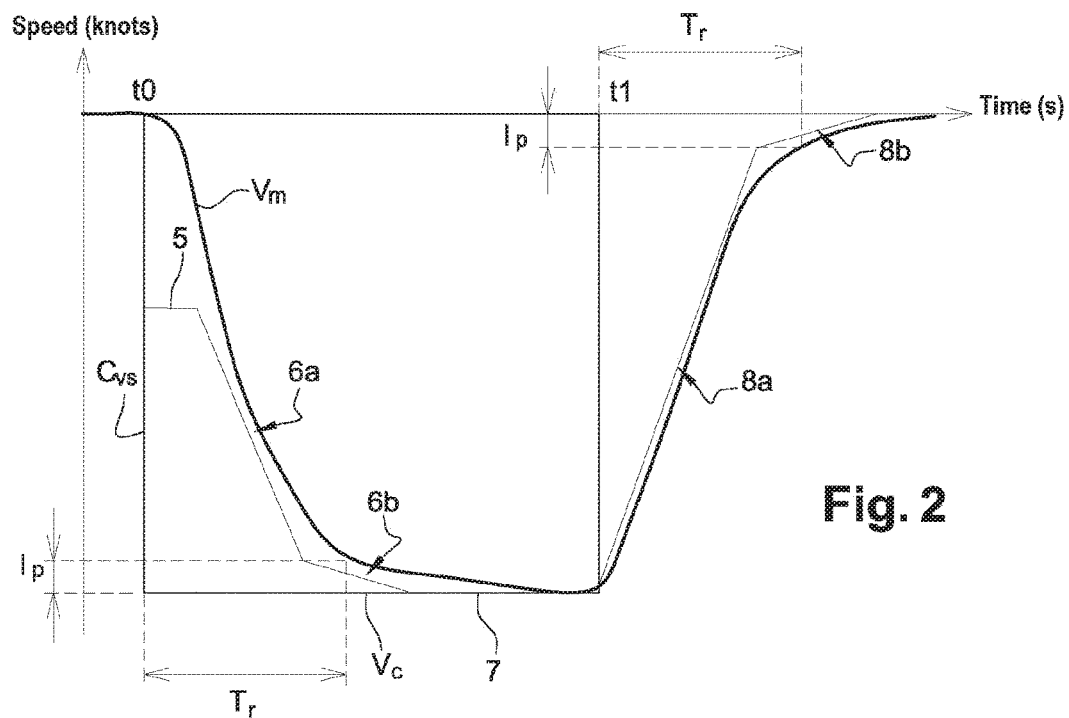
FIG. 2 shows examples of curves for a ground speed setpoint, for an optimized speed setpoint, and for a measured speed.

With reference to FIGS. 1 and 2, the aircraft pilot, during stages of taxiing, generates a ground speed setpoint Cvs for moving the aircraft. Embodiments of the control method of the present disclosure implement a processing system 1 that uses the ground speed setpoint Cvs to control the ground speed of the aircraft during stages in which the aircraft is taxiing.

In the example shown, the ground speed setpoint Cvs is a step function corresponding to maneuvering the aircraft backwards. Such backwards maneuvering is relatively critical since it is advisable not to actuate the brake pedal in order to avoid tilting the aircraft. At a starting time t0, the ground speed setpoint Cvs passes from a zero speed to a constant target speed Vc (where the target speed Vc in this example is negative), and then, at a stop time t1, it passes from the target speed Vc to a zero speed.

On the basis of the ground speed setpoint Cvs, the electrical control module generates a torque command Coc for application to the wheels of the main landing gear. The torque command Coc is transmitted to the electrical power module. The electrical power module uses the torque command Coc to generate a control electric current, which it transmits to the electric motor.

The actual speed of the aircraft is measured by speed sensors of the aircraft. The speed sensors are situated at the front of the aircraft, close to the cockpit. The speed control of the aircraft is thus control of a speed at the front of the aircraft, thus enabling the pilot to sense directly the effects of the speed control.

The measured speed Vm is processed by a speed measurement processing block 2 in the processing system 1. The speed measurement processing block 2 has a filter for eliminating measurement noise present in the measured speed Vm, and thus to avoid any oscillations resulting from the measurement noise propagating along the processing system 1. The cutoff frequency of this filter is directly proportional to the measured speed Vm: the faster the measured speed Vm, the greater the amount of filtering. This limits the delay induced by filtering at low or very low speed, and improves the stability of the processing system 1. A filtered measured speed Vmf is obtained at the output from the speed measurement processing block 2.

The ground speed setpoint Cvs is processed by a ground speed processing block 4, which transforms the ground speed setpoint Cvs into an optimized speed setpoint Cvo. A regulator loop 3 is then implemented, using as its setpoint the optimized ground speed setpoint Cvo.

The optimized ground speed setpoint Cvo presents a curve as a function of time that has a predefined profile made up of a plurality of linear portions. The predefined profile has a starting linear portion 5, two acceleration linear portions 6, a target speed linear portion 7, and two deceleration linear portions 8. The starting linear portion 5 presents a slope of zero and it defines a predetermined speed level that is smaller than the target speed Vc.

The predetermined speed level is used to ensure that the aircraft can be set into motion in spite of the possible occurrence of a so-called "square-wheel" phenomenon, and that this can be done instantaneously. Whenever the aircraft is stationary on the ground over a certain period of time, the circumference of the wheel in contact with the ground tends to take on a shape matching the profile of the ground. The wheel (and the ground) therefore opposes resistance to movement of the aircraft. In order to move the aircraft in instantaneous manner, it is appropriate on starting to apply a torque that is not less than a release torque. The predetermined speed level makes it possible, in the regulator loop 3, to generate a large speed error $\varepsilon v$ (equal to the difference between the optimized speed setpoint Cvo and the measured speed Vm) that produces a large torque command Coc, that is not less that the release torque. In the absence of this predetermined speed level, there would be a risk that actual movement of the aircraft would begin only several seconds after the movement is requested.

The starting linear portion 5 is followed by two acceleration linear portions 6 that bring the optimized speed setpoint Cvo to a value equal to the value of the ground speed setpoint Cvs (i.e. to the target speed Vc). The two acceleration linear portions 6 comprise a first acceleration linear portion 6a bringing the optimized speed setpoint Cvo to a value lying in an accuracy range Ip by the end of a response time Tr, and a second acceleration linear portion 6b that brings the optimized speed setpoint Cvo to a value equal to the ground speed setpoint Cvs (i.e. to the target speed Vc). The accuracy range Ip and the response time Tr are "specified", i.e. they satisfy specifications of the aircraft manufacturer for ensuring the taxiing performance of the aircraft.

The first acceleration portion 6a thus serves to obtain a measured speed Vm that lies within the accuracy range Ip at the end of the response time Tr. The slope of the second acceleration linear portion 6b is adjusted to ensure that the ground speed of the aircraft is stabilized, such that the measured speed Vm presents a minimum overshoot value relative to the ground speed setpoint Cvo. It should be observed that since the measured speed Vm already lies in the accuracy range Ip, the value of the slope of the second acceleration linear portion 6b is not tied to a specification. Its slope may indeed be relatively small, and it is not taken into account in the response time Tr of the processing system 1.

The slope of the first acceleration linear portion 6a and the slope of the second acceleration linear portion 6b are thus each a function of specifications of the aircraft manufacturer and/or the dynamic error of the processing system 1, and/or of the ground speed setpoint Cvs. This ensures that the torque command Coc is not overdimensioned, thereby reducing the mechanical stresses to which the main landing gear and the electrical taxiing system are subjected.

The target speed linear portion 7, following on from the first acceleration linear portion 6a and the second acceleration linear portion 6b presents a slope of zero. The speed of the aircraft is stabilized at the target value Vc to the moment t1 where the ground speed setpoint Cvs becomes zero.

The target speed linear portion 7 is followed by the two deceleration linear portions 8 that, once the ground speed setpoint Cvs has become zero, bring the optimized speed setpoint Cvo to a value of zero. Among the two deceleration linear portions 8, there is a first deceleration linear portion 8a that brings the optimized speed setpoint Cvo to a value lying in the accuracy range Ip by the end of a response time Tr, and a second deceleration linear portion 8b that brings the optimized speed setpoint Cvo to a value of zero. The definition of the first deceleration linear portion 8a is thus similar to the definition of the first acceleration linear portion 6a.

The second deceleration linear portion 8b is very important since it enables the aircraft to be stopped progressively and enables the electrical taxiing system to be given accuracy that is satisfactory and sufficient for finishing off the maneuver of the aircraft.

The slope of the first deceleration linear portion 8a and the slope of the second deceleration linear portion 8b are thus each a function of the specifications of the aircraft manufacturer and/or of the dynamic error of the processing system 1, and/or of the ground speed setpoint Cvs.

It should be observed that a linear portion equivalent to the starting linear portion 5 is not necessary since the "square-wheel" type phenomenon assists in braking (the action that is desired at this moment).

The above-described predefined profile having a plurality of linear portions enables the processing system 1 to be adjusted in such a manner as to obtain speed control with a response time that is fast, with good stability, and with low static error.

Still referring to FIGS. 1 and 2, the regulator loop 3 has a first subtracter 10, a second subtracter 11, a third subtracter 12, a summing circuit 13, together with a proportional block 14, an integrator block 15, and a differentiator block 16. The proportional block 14, the integrator block 15, and the differentiator block 16 form a proportional, integral, derivative regulator.

The first subtracter 10 subtracts the filtered measured speed Vmf from the optimized speed Cvo in order to produce a filtered speed error εvf. The filtered speed error εvf is applied as input to the proportional block 14.

It is preferable for the speed error to be filtered on input to the proportional block 14 so as to avoid obtaining a level of noise at the output from the proportional block 14 that is equivalent to the level of noise present in the measured speed Vm. Because of this filtering, the proportional block 14 runs the risk of generating a delay and of creating instability in the processing system 1.

Figure 3:
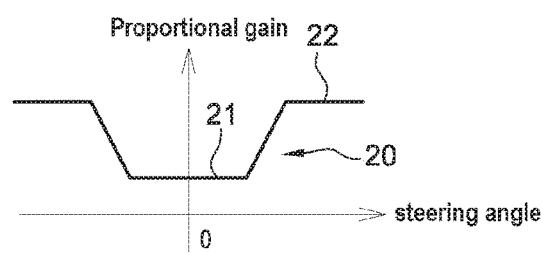
FIG. 3 shows an example of a proportional gain curve of a proportional block of a regulator loop of the processing system.

With additional reference to FIG. 3, a proportional block 14 is thus selected that presents a proportional gain 20 that depends on the steering angle of the steerable portion of the auxiliary landing gear of the aircraft. Specifically, since the speed control of the aircraft is control of the forward speed of the aircraft, the controlled speed depends on the steering angle. By defining a small value 21 for the proportional gain 20 when the steering angle is close to zero, the sensitivity to the noise in the measured speed (present in the measured speed Vs) is reduced. This small value 21 for the proportional gain 20 is solely determined by the characteristics of the acceleration stage (and thus the acceleration linear portion 6) and of the deceleration stage (and thus the deceleration linear portion 8) in order to obtain the required response time Tr.

When steering angle increases (in absolute value), the dynamic range of the nose of the aircraft also increases. The proportional gain 20 of the proportional block 14 is then increased and reaches a high value 22 that enables the processing system 1 to be more robust in the face of disturbances, and that makes it possible to keep the measured speed Vm of the aircraft in the specified accuracy range Ip. The high value 22 for the proportional gain 20 is determined so that the processing system 1 is robust in the face of steering maneuvers at stabilized speed (i.e. at the value of the target speed Vc).

Figure 4:
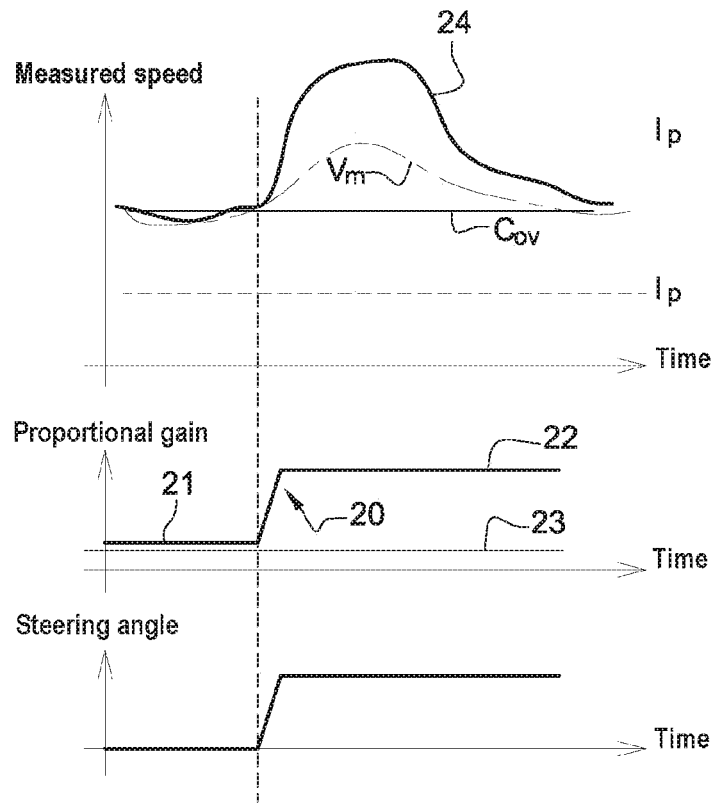
FIG. 4 shows examples of curves for measured speeds, for proportional gains of the proportional block, and for a steering angle.

An advantage of using proportional gain 20 that is a function of the steering angle is illustrated in FIG. 4. It can be seen that when the proportional gain used is a constant gain 23 of small value, the dynamic range of a steering maneuver is too great for the processing system 1, since the required increase in speed is too great. The measured speed curve 24 then presents an overshoot value that is large compared with the accuracy range Ip.

When the proportional gain 20 of the proportional block 14 depends on the steering angle, presenting a small value 21 when the steering angle is small and a large value 22 when the steering angle is larger, the reactivity of the processing system 1 is improved and the measured speed Vm is kept in the accuracy range Ip.

There is no need for the steering angle to be very large in order to observe this phenomenon: a steering angle of 40°, as is frequently obtained when performing a pushback maneuver of the aircraft, suffices.

Returning to FIGS. 1 and 2, the second subtracter 11 subtracts the measured speed Vm (not filtered) from the optimized speed setpoint Cvo in order to produce the speed error εv. The third subtracter 12 subtracts the output from an anti-windup block 30 (described in greater detail below) from the speed error εv in order to produce a corrected speed error εvc. The corrected speed error εvc is applied as input to the integrator block 15.

It should be observed that the input of the integrator block 15 does not require filtering, since the integrator block 15 itself constitutes a filter. The integrator block 15 filters the noise present in the measured speed Vm without adding any delay due to processing the speed. The speed error εv is also corrected by the anti-windup block 30.

Figure 5:
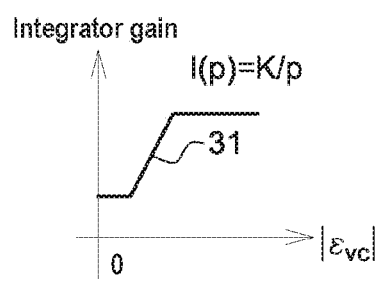
FIG. 5 shows an example of a curve for integrator gain of an integrator block of the regulator loop of the processing system.

With reference to FIG. 5, the integrator gain 31 of the integrator block 15 depends on the absolute corrected speed error |εvc|.

The integrator gain 31 of the integrator block 15 is:

$$I(p)=K/p$$

When the absolute corrected speed error |εvc| is large, e.g., during stages of acceleration and deceleration, a high integrator gain 31 is used to make the processing system 1 more reactive and to obtain the specified response time Tr.

When the absolute corrected speed error |εvc| is small, e.g., when the measured speed Vm is close to the optimized speed setpoint Vco, the level of integration required is less important for dynamic behavior. Integration serves mainly to compensate for static error. Furthermore, as with the proportional gain 20, the small value for the integrator gain 31 at stabilized speed serves to reduce sensitivity to the noise present in the measured speed Vm.

Figure 6:
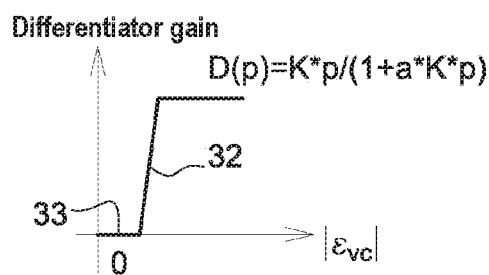
FIG. 6 shows an example of a curve for differentiator gain of a differentiator block of the regulator loop of the processing system.

The corrected speed error εvc is also applied as input to the differentiator block 16. Once more, it should be observed that the input of the differentiator block 16 does not require filtering, since the differentiator block 16 itself constitutes a filter. The differentiator block 16 filters the noise present in the measured speed Vm without adding any delay due to processing the speed. The speed error εv is also corrected by the anti-windup block 30;

With reference to FIG. 6, the differentiator gain 32 of the differentiator block depends on the absolute corrected speed error |εvc|.

The differentiator gain 32 of the differentiator block 16 is given by:

$$D(p)=K*p/(1+a*K*p)$$

When the absolute corrected speed error |εvc| is high, e.g., during stages of acceleration and deceleration, a high value for the differentiator gain 32 is used to make the processing system 1 more reactive and to stabilize the processing system by avoiding large overshoot values.

When the absolute corrected speed error |εvc| is small, e.g., when the measured speed Vm is close to the optimized speed setpoint Vco, the level of differentiation required is less important for the dynamic behavior. In addition, the differentiator block 16 can produce calculation noise when the absolute corrected speed error |εvc| is very small. Consequently, the differentiator block 16 is not used when the measured speed Vm is very close to the optimized speed setpoint Cvo. More precisely, and as can be seen in FIG. 6, the differentiator gain 32 is zero when the absolute corrected speed error |εvc| is very small (zone 33 in FIG. 6).

Returning to FIG. 1, the summing circuit 13 adds together the output from the proportional block 14, the output from the integrator block 15, and the output from the differentiator block 16 in order to obtain a regulated torque command Ccr as output from the regulator loop 3. The regulated torque command Ccr is applied as input to a protection block 40 for obtaining the torque command Coc. In this example, the protection block 40 performs slope limiting and saturation functions.

The anti-windup block 30 performs an anti-windup function. The anti-windup block 30, which receives the regulated torque command Ccr and the torque command Coc, produces an anti-windup torque Cae defined as being equal to the difference between the most recent regulated torque command Ccr and the most recent torque command Coc. The anti-windup torque Cae may be weighted by a weighting coefficient, if necessary. The anti-windup function operates by feedback. It serves to keep the output from the integrator block 15 and the output from the differentiator block 16 away from saturation zones. This serves to retain good reactivity for the processing system 1, since there is no need to reduce the levels of filtering.

Naturally, the present disclosure is not limited to the implementation described but covers any variant coming within the ambit of the disclosure as defined by the claims.

Although two acceleration (and deceleration) linear portions are described, it is possible to use only one acceleration (and deceleration) linear portion, or indeed to use some other number of acceleration (and deceleration) linear portions.

Although it is stated that the speed sensors are situated at the front of the aircraft, the sensors may be situated elsewhere, and for example they may comprise a sensor for sensing the speed of the electric motor, a sensor for sensing the speed of a main landing gear wheel, or of an auxiliary landing gear wheel.

It is also possible to perform speed control on the basis of a speed other than the front speed of the aircraft, and naturally it is possible to generate as output from the processing system a command that is other than the torque command.

It should be understood that the description above includes sections that are presented largely in terms of logic and/or operations that may be performed by electronic components for implementing the technologies and methodologies described herein. When programmed with such logic or performing such operations, these electronic components become special purpose electronic components or computers. In embodiments of the present disclosure, these electronic components include but are not limited to modules, including the electrical power module and the electrical control module described above.

This logic can be carried out in either hardware or software, or a combination of hardware and software. In some embodiments, each module may include one or more computing devices such as a processor (e.g., a microprocessor), a central processing unit (CPU), a digital signal processor (DSP), an application-specific integrated circuit (ASIC), a field-programmable gate array (FPGA), etc., and any combinations thereof, and/or can include discrete digital or analog circuit elements or electronics, or combinations thereof.

In an embodiment, the electrical power module and/or the electrical control module includes a microprocessor and a memory storing logic modules and/or instructions. In an embodiment, the electrical power module and/or the electrical control module includes one or more ASICs having a plurality of predefined logic components. In an embodiment, the electrical power module and/or the electrical control module includes one or more FPGA having a plurality of programmable logic components. In an embodiment, the electrical power module and/or the electrical control module includes hardware circuit implementations (e.g., implementations in analog circuitry, implementations in digital circuitry, and the like, and combinations thereof). In an embodiment, the electrical power module and/or the electrical control module includes combinations of circuits and computer program products having software or firmware instructions stored on one or more computer readable memories that work together to cause a device, system or unit to perform one or more methodologies or technologies described herein.

The principles, representative embodiments, and modes of operation of the present disclosure have been described in the foregoing description. However, aspects of the present disclosure which are intended to be protected are not to be construed as limited to the particular embodiments disclosed. Further, the embodiments described herein are to be regarded as illustrative rather than restrictive. It will be appreciated that variations and changes may be made by others, and equivalents employed, without departing from the spirit of the present disclosure. Accordingly, it is expressly intended that all such variations, changes, and equivalents fall within the spirit and scope of the present disclosure, as claimed.

The invention claimed is:

1. A control method for controlling an electrical taxiing system adapted to moving an aircraft while it is taxiing, the method comprising the steps of:
generating a ground speed setpoint for the aircraft;
transforming the ground speed setpoint into an optimized speed setpoint presenting a curve as a function of time that has a predefined function comprising a plurality of linear portions, each having a slope that is a function of the ground speed setpoint;
implementing a regulator loop having the optimized speed setpoint as its setpoint; and
generating a command for the electrical taxiing system from an output of the regulator loop.

2. The control method according to claim 1, wherein the plurality of linear portions comprises a starting linear portion presenting a slope of zero and defining a predetermined speed level that is smaller than the ground speed setpoint.

3. The control method according to claim 2, wherein the starting linear portion is followed by a plurality of acceleration linear portions that bring the optimized speed setpoint to a value equal to a value of the ground speed setpoint.

4. The control method according to claim 2, wherein the plurality of acceleration linear portions comprises a first acceleration linear portion that brings the optimized speed setpoint to a value lying within a specified accuracy range by the end of a specified response time, and a second acceleration linear portion that brings the optimized speed setpoint to a value equal to a value of the ground speed setpoint.

5. The control method according to claim 1, wherein the plurality of linear portions includes a plurality of deceleration linear portions that, when the ground speed setpoint becomes zero, bring the optimized speed setpoint to a value of zero.

6. The control method according to claim 5, wherein the plurality of deceleration linear portions comprise a first deceleration linear portion that brings the optimized speed setpoint to a speed value lying within a specified accuracy range by the end of a specified response time, and a second deceleration linear portion that brings the optimized speed setpoint to the value of zero.

7. The control method according to claim 1, wherein the regulator loop comprises a proportional, integral, and derivative regulator having a proportional block, an integrator block, and a differentiator block.

8. The control method according to claim 7, wherein a filtered speed error is applied as input to the proportional block.

9. The control method according to claim 7, wherein the proportional block presents gain that depends on a steering angle of a steerable portion of landing gear of the aircraft.

10. The control method according to claim 7, wherein the integrator block presents gain that depends on a speed error.

11. The control method according to claim 7, wherein the differentiator block presents gain that depends on a speed error.

12. The control method according to claim 11, wherein the gain of the differentiator block is zero when the speed error is zero.

13. The control method according to claim 1, wherein the regulator loop includes an anti-windup block.

14. The control method according to claim 1, wherein the command of the electrical taxiing system is a torque command for applying to wheels of the aircraft.

* * * * *